(12) United States Patent
Best

(10) Patent No.: US 10,157,172 B2
(45) Date of Patent: Dec. 18, 2018

(54) PROPERTY DEPENDENCY VISUALIZATION

(75) Inventor: Casey A. Best, Whitby (CA)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 12/199,523

(22) Filed: Aug. 27, 2008

(65) Prior Publication Data

US 2010/0058164 A1 Mar. 4, 2010

(51) Int. Cl.
*G06F 3/0481* (2013.01)
*G06F 17/24* (2006.01)

(52) U.S. Cl.
CPC .......... *G06F 17/243* (2013.01); *G06F 17/241* (2013.01)

(58) Field of Classification Search
CPC ............... G06F 17/243; G06F 17/2247; G06F 17/2725; G06F 17/30589; G06F 3/0482
USPC .................................................. 715/711, 780
See application file for complete search history.

(56) References Cited

U.S. PATENT DOCUMENTS

| | | | | |
|---|---|---|---|---|
| 7,251,782 B1 * | 7/2007 | Albers | ................... | G06F 3/0481 715/708 |
| 7,296,017 B2 * | 11/2007 | Larcheveque | ...... | G06F 17/2247 |
| 7,406,660 B1 * | 7/2008 | Sikchi | ................. | G06F 17/2264 715/236 |
| 7,430,711 B2 * | 9/2008 | Rivers-Moore | ....... | G06F 17/248 715/221 |
| 7,516,399 B2 * | 4/2009 | Hsu | ...................... | G06F 17/2247 715/234 |
| 7,562,304 B2 * | 7/2009 | Dixon | ............... | G06F 17/30861 705/35 |
| 7,765,481 B2 * | 7/2010 | Dixon et al. | .................. | 715/738 |
| 7,899,674 B1 * | 3/2011 | Rubin | ..................... | G10L 15/26 345/418 |
| 7,930,644 B2 * | 4/2011 | Silva | ................... | H04L 12/2809 715/771 |
| 8,234,562 B1 * | 7/2012 | Evans | ................... | G06F 17/243 715/221 |
| 8,694,953 B2 * | 4/2014 | Khodabandehloo | ...... | G06F 8/20 715/717 |
| 2003/0149934 A1 * | 8/2003 | Worden | ........................ | 715/513 |
| 2003/0234816 A1 | 12/2003 | Rosen et al. | | |
| 2004/0226002 A1 * | 11/2004 | Larcheveque | ...... | G06F 17/2247 717/126 |
| 2004/0268229 A1 * | 12/2004 | Paoli | ..................... | G06F 17/243 715/200 |
| 2005/0131777 A1 | 6/2005 | Davidson et al. | | |
| 2008/0126402 A1 * | 5/2008 | Sikchi | ................ | G06F 17/2264 |

\* cited by examiner

*Primary Examiner* — Namitha Pillai
(74) *Attorney, Agent, or Firm* — Steven M. Greenberg, Esq.; Shutts & Bowen LLP

(57) ABSTRACT

Embodiments of the present invention provide a method, system and computer program product for property dependency visualization. In an embodiment of the invention, a method for property dependency visualization can be provided. The method can include detecting a proximity event for a control in a user interface (UI) and determining a dependency relationship between a property for the control and at least one other property for at least one control in the UI. Thereafter, a view of the dependency relationship can be rendered in connection with the control for which the proximity event is detected. In this way, tracking dependencies in a large form of a multiplicity of controls can be facilitated.

12 Claims, 2 Drawing Sheets

PROPERTY DEPENDENCY VISUALIZATION

BACKGROUND OF THE INVENTION

Field of the Invention

The present invention relates to the field of user interface (UI) control properties and more particularly to identifying dependencies between the properties of UI controls in a UI for a computer application.

Description of the Related Art

The UI provides the interface between program logic and end user. Through the UI, the end user can provide input requisite to the operation of a computer application, and the end user can view resulting output provided by the computer application. The UI can vary from a textual interface to a graphical interface and the UI can be formed through complex program logic, or simple markup language interpretable within a browser. Common to every UI is the arrangement of controls. Controls provide the atomic elements of the UI that permit direct interaction between the end user and the computer application. Examples include text fields, buttons, drop down lists, and the like. A control generally includes one or more properties affecting the appearance and operation of the control. Typical properties that affect the display of the control include a foreground and background color, font type and size, and whether or not the control is enabled or disabled.

The form is a type of UI known to be extraordinarily effective in providing an interface for data collection. Form based input is the enabling technology which permits the widespread distribution of applications across generic client platforms such as the conventional content browser. In the prototypical distributed application, a markup language defined interface can form the principal conduit through which end users can interact with backend application logic. Often configured in the form of a Web page, the interface can be provided to the content browser by a content server and can take the form either of a pre-defined static page, or a dynamically generated page. Form input fields can be positioned within the UI through which user input can be accepted and posted to the backend application logic for further processing.

Simple forms require little planning during the development stage. In this regard, the developer can place a selection of controls within the form in an ad hoc fashion in order to provide an interface through which the end user can interact with backend logic. Complex forms, however, can require substantial planning—particularly as the form spans multiple different viewable pages. The development effort in selecting controls for incorporation into a large form, and also the arrangement of the controls across multiple pages can be a monumental organizational task. To compound matters, some controls are dependent upon others in a form.

Specifically, one or more controls placed deep within a large form often derive properties from other controls placed earlier in the large form. Thus, oftentimes, control properties for controls within a large form are said to depend upon the properties of other controls in the form. By way of example, a first control in a UI may be enabled only when sufficient input has been provided to a second control in the UI. A property within the first control, then, is said to depend upon the property of the second control and a "dependency" property within the first control can expressly define the dependency on the second control. As another example, the background color of one field in a form can be dependent on the background color property of the page in which the field resides. Tracking dependencies in a large form of a multiplicity of controls can be challenging and, in many cases, the developer remains unaware of a dependency as the developer modifies the properties of a control in a form that is dependent upon the properties of another control in the form.

BRIEF SUMMARY OF THE INVENTION

Embodiments of the present invention address deficiencies of the art in respect to control dependency management in a UI and provide a novel and non-obvious method, system and computer program product for property dependency visualization. In an embodiment of the invention, a method for property dependency visualization can be provided. The method can include detecting a proximity event for a control in a UI and determining a dependency relationship between a property for the control and at least one other property for at least one other control in the UI. Thereafter, a view of the dependency relationship can be rendered in connection with the control for which the proximity event is detected. In this way, tracking dependencies in a large form of a multiplicity of controls can be facilitated.

In one aspect of the embodiment, rendering a view of the dependency relationship in connection with the control for which the proximity event is detected can include rendering a text string explaining the dependency relationship. In another aspect of the embodiment, rendering a view of the dependency relationship in connection with the control for which the proximity event is detected can include rendering a text string warning of consequences arising from the dependency relationship. In yet another aspect of the embodiment, rendering a view of the dependency relationship in connection with the control for which the proximity event is detected can include rendering a hierarchical view of the dependency relationship.

In another embodiment of the invention, a forms based input data processing system can be configured for property dependency visualization. The system can include a UI defined in markup and rendered in a content browser executing in a host computing platform. Multiple different controls can be defined by the UI, and each of the controls can include at least one property. Finally, dependency visualization logic can be coupled to the content browser and can execute in the host computing platform. The logic can include program code enabled to detect a proximity event for a control amongst the controls, to determine a dependency relationship between a property for the control and at least one other property for at least one other of the controls and to render a view of the dependency relationship in connection with the control for which the proximity event is detected.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for property dependency visualization. In accordance with an embodiment of the present invention, dependency relationships between a property for a UI control and other UI controls can be tracked. In response to a proximity event for the UI control, at least one dependency relationship can be determined for a property of the UI control and another property of another UI control. Thereafter, a view of the dependency relationship can be presented in connection with the UI control. Optionally, a hierarchy of all dependencies stemming from all other UI controls related to the UI control can be determined in response to the proximity event and a hierarchical view of the dependencies in the hierarchy can be displayed in connection with the UI control.

Figure 1A:
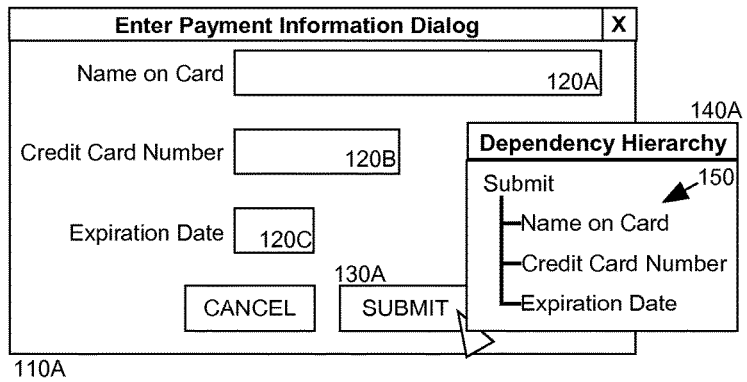
FIGS. 1A and 1B, taken together, are a pictorial illustration of screen shots of a UI configured for property dependency visualization.
Figure 1B:
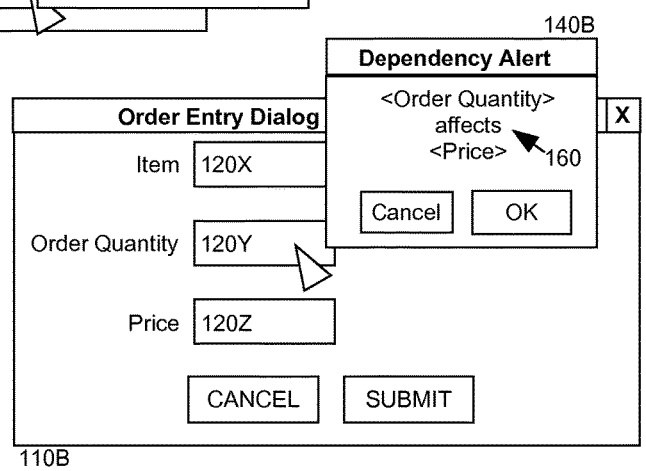

In illustration, FIGS. 1A and 1B, taken together, pictorially depict different screen shots of exemplary UIs configured for property dependency visualization. Referring to FIG. 1A, a UI 110A is shown to include multiple different controls 120A, 120B, 120C, 130A. By way of example, control 130A includes an enablement property dependant upon the completion of the value property of the controls 120A, 120B, 120C such that the control 130A is not enabled to submit the value properties of the controls 120A, 120B, 120C so long as the value property of each of the controls 120A, 120B, 120C remains empty. A proximity event such as a mouse-over event or a selection event to the control 130A, triggers the display of pop up 140A. The pop-up 140A includes a hierarchical view 150 of the dependency relationships between the control 130A and the controls 120A, 120B, 120C.

Referring now to FIG. 1B, a UI 110B is shown to include multiple different controls 120X, 120Y, 120Y. By way of example, the value property for control 120Y affects the computation of the value property for control 120Z such that the value property for control 120Z is dependent upon the value property for control 120Y. As such, in response to a proximity event for control 120Y, a pop-up 140B can be displayed to include an indication of the dependency relationship 160 between the value property of control 120Y and the value property of control 120Z. Optionally, the pop-up 140B can be a confirmation message box triggered upon changing the value property of control 120Y. It is to be recognized by the skilled artisan that although a dependency relationship has been illustrated in connection with value properties, the invention is not so limited and other property dependencies are contemplated to be within the scope of the invention. For example, a dependency relationship can exist between a property of one control and the location property of another control.

Figure 2:
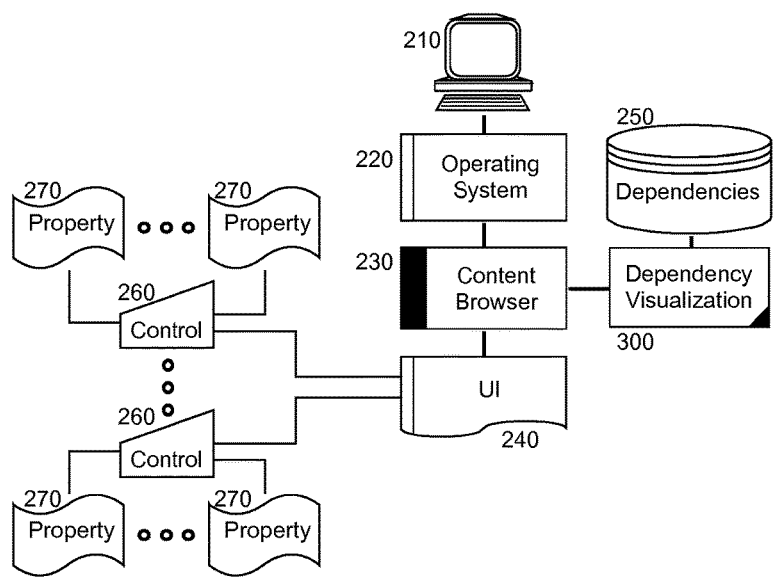
FIG. 2 is a schematic illustration of a forms based input data processing system configured for property dependency visualization; and, FIG. 3 is a flow chart illustrating a process for property dependency visualization in a UI of controls with dependent properties.

The UIs 110A, 110B generated in the exemplary embodiments described in connection with FIGS. 1A and 1B can be produced as part of a forms based input data processing system. In further illustration, FIG. 2 schematically shows a forms based input data processing system configured for property dependency visualization. The system can include a host computing platform 210 supporting an operating system 220. The operating system in turn can manage the execution of different applications including content browser 230. The content browser 230 can be configured to render markup received from over a computer communications network as a UI 240 including multiple different controls 260, each of the controls 260 further including one or more properties 270.

Notably, dependency visualization logic 300 can be coupled to the content browser 230. The dependency visualization logic 300 can include program code enabled to respond to a proximity event for a first one of the controls 260 in the UI 240 by identifying and storing one or more dependency relationships between a property 270 for the first one of the controls 260 and at least one other property 270 for at least one other one of the controls 260 in a data structure of dependencies 250. The program code of the dependency visualization logic 300 further can be enabled to render a view of the dependency relationship in the data structure of dependencies 250 in connection with the first on of the controls 260, for example as a pop-up, dialog box, message box, or tool-tip. Optionally, the view of the dependency relationship can be a hierarchical diagram of dependency relationships beginning with the property 270 for the first one of the controls 260 and continuing through other related properties 270 for other ones of the controls 260.

Figure 3:
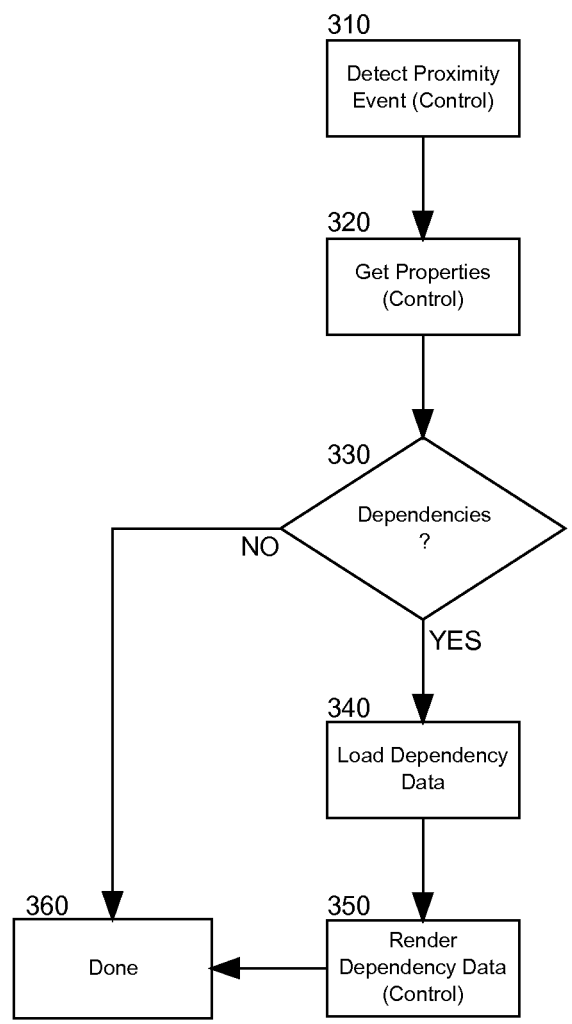

In yet further illustration of the operation of the dependency visualization logic 300, FIG. 3 is a flow chart illustrating a process for property dependency visualization in a UI of controls with dependent properties. Beginning in block 310, a proximity event can be detected in connection with a control in a UI. For example, the proximity event can be a selection event, a mouse-over event, or even a key-down event. In block 320, one or more properties can be retrieved for the control. By way of example, the properties for the control can include display type properties such as background color, font type and font style, or operational type properties such as a value, a function, or a state of enablement or disablement.

In decision block 330, it can be determined whether or not a dependency relationship exists between any property of the control and any other properties of other controls in the GUI. If so, in block 340, dependency data for the dependency relationships can be loaded, for example a hierarchy such as a tree can be constructed for the dependency relationship, or a text string describing the dependency relationship can be constructed such as "changing <property1> affects <property2>". Thereafter, in block 350, the dependency data can be rendered in connection with the control, for instance as a pop-up overlapping or adjacent to the control. Finally, in block 360 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method comprising:
   displaying a first user interface display on a display device of a computer with at least one processor, memory and supporting an operating system, with the first user interface display comprising a dialog box including a first visual feature corresponding to a multiplicity of user fillable text input fields having a hierarchical relationship with a first one of the text input fields having a portion of the hierarchical relationship with a second one of the text input fields such that providing data input for the first one of the text input fields impacts a value for the second one of the text input fields, and a second visual feature corresponding to a form submission option and a cursor;
   receiving textual user input in the dialog box through a user input device in connection with the first one of the text input fields;
   responsive to the textual user input, displaying a second user interface display as a pop-up window over the dialog box on the display device in proximity to the first one of the text input fields and including in the second user interface display an alert indicating that providing data input in the first one of the textual input fields impacts a value of the second one of the textual input fields; and,
   responsive to a mouse-over event in connection with the form submission option, displaying a third user interface display as a pop-up window over the dialog box on the display device and including in the third user interface display a visualization of the form submission option and a hierarchical relationship of all of the multiplicity of the text input fields to be submitted upon activating the form submission option.

2. The method of claim 1, further comprising determining a dependency relationship in connection with the second visual feature and a first visual feature and rendering in the display device a text string explaining the dependency relationship.

3. The method of claim 1, further comprising determining a dependency relationship in connection with the second visual feature and a first visual feature and rendering in the display device a text string warning of consequences arising from the dependency relationship.

4. The method of claim 1, further comprising determining a dependency relationship in connection with the second visual feature and a first visual feature and rendering in the display device a hierarchical view of the dependency relationship.

5. A forms based input data processing system configured for property dependency visualization, the system comprising:
   a display device comprising at least one computer with at least one processor and memory;
   a user interface (UI) for a computer program executing in the memory of the computer, the UI being defined in markup and rendered in a content browser of the display device and executing in memory of the display device;
   a multiplicity of controls defined by the UI, each of the controls permitting direct interaction between an end user and the computer program, each of the controls comprising multiple different properties, each property being selected from the group consisting of a foreground and background color, a font type and size, and whether or not the control is enabled or disabled; and,
   dependency visualization logic coupled to the content browser and executing in the display device, the logic comprising program code enabled to display a first user interface display comprising a dialog box on the display device, with the first user interface including a first visual feature corresponding to a multiplicity of user fillable text input fields having a hierarchical relationship with a first one of the text input fields having a portion of the hierarchical relationship with a second one of the text input fields such that providing data input for the first one of the text input fields impacts a value for the second one of the text input fields, and a second visual feature corresponding to a form submission option and a cursor, to receive textual user input in the dialog box through a user input device in connection with the first one of the text input fields, to respond to the textual user input by displaying a second user interface display as a pop-up window over the dialog box on a display device in proximity to the first one of the text input fields and including in the second user interface display an alert indicating that providing data input in the first one of the text input fields impacts a value of the second one of the text input fields and to respond to a mouse-over event in connection with the form submission option by displaying a third user interface display as a pop-up window over the dialog box on the display device and including in the third user interface display a visualization of the hierarchical relationship of all of the multiplicity of the text input fields to be submitted upon activating the form submission option.

6. The system of claim 5, wherein the program code is further enabled to determine a dependency relationship in connection with the second visual feature and a first visual feature and render in the display device a text string explaining the dependency relationship.

7. The system of claim 5, wherein the program code is further enabled to determine a dependency relationship in connection with the second visual feature and a first visual feature and to render in the display device a text string warning of consequences arising from the dependency relationship.

8. The system of claim 5, wherein the program code is further enabled to determine a dependency relationship in connection with the second visual feature and a first visual feature and to render in the display device a hierarchical view of the dependency relationship.

9. A computer program product comprising a non-transitory computer usable storage medium storing computer usable program code for property dependency visualization, the computer program product comprising:

computer usable program code for displaying a first user interface display on a display device of a computer with at least one processor, memory and supporting an operating system, with the first user interface display comprising a dialog box including a first visual feature corresponding to a multiplicity of user fillable text input fields having a hierarchical relationship with a first one of the text input fields having a portion of the hierarchical relationship with a second one of the text input fields such that providing data input for the first one of the text input fields impacts a value for the second one of the text input fields, and a second visual feature corresponding to a form submission option and a cursor;

computer usable program code for receiving textual user input in the dialog box through a user input device in connection with the first one of the text input fields;

computer usable program code for responding to the textual user input by displaying a second user interface display as a pop-up window over the dialog box on the display device in proximity to the first one of the text input fields and including in the second user interface display an alert indicating that providing data input in the first one of the textual input fields impacts a value of the second one of the textual input fields; and, computer usable program code for responding to a mouse-over event in connection with the form submission option by displaying a third user interface display as a pop-up window over the dialog box on the display device and including in the third user interface display a visualization of the form submission option and a hierarchical relationship of all of the multiplicity of the text input fields to be submitted upon activating the form submission option.

10. The computer program product of claim 9, further comprising determining a dependency relationship in connection with the second visual feature and a first visual feature and rendering in the display device a text string explaining the dependency relationship.

11. The computer program product of claim 9, further comprising determining a dependency relationship in connection with the second visual feature and a first visual feature and rendering in the display device a text string warning of consequences arising from the dependency relationship.

12. The computer program product of claim 9, further comprising determining a dependency relationship in connection with the second visual feature and a first visual feature and rendering in the display device a hierarchical view of the dependency relationship.

* * * * *